(12) United States Patent
Yamaguchi (10) Patent No.: US 9,120,530 B2
(45) Date of Patent: Sep. 1, 2015

(54) BICYCLE DERAILLEUR WITH CHAIN GUIDE LOCKING

(75) Inventor: Sota Yamaguchi, Sakai (JP)

(73) Assignee: Shimano, Inc., Sakai (JP)

( * ) Notice: Subject to any disclaimer, the term of this patent is extended or adjusted under 35 U.S.C. 154(b) by 237 days.

(21) Appl. No.: 13/467,532

(22) Filed: May 9, 2012

(65) Prior Publication Data

US 2013/0303317 A1    Nov. 14, 2013

(51) Int. Cl.
*B62M 9/124*    (2010.01)
*B62M 9/126*    (2010.01)

(52) U.S. Cl.
CPC ..................... *B62M 9/126* (2013.01)

(58) Field of Classification Search
CPC ... B62M 9/1244; B62M 9/1248; B62M 9/126
USPC ........................................ 474/80, 82
See application file for complete search history.

(56) References Cited

U.S. PATENT DOCUMENTS

| | | | |
|---|---|---|---|
| 3,974,707 A * | 8/1976 | Nagano | 474/82 |
| 4,037,484 A * | 7/1977 | Morse | 474/82 |
| 4,185,510 A * | 1/1980 | Juy | 474/82 |
| 4,406,643 A | 9/1983 | Shimano | |
| 4,530,677 A * | 7/1985 | Nagano | 474/80 |
| 5,201,236 A | 4/1993 | Nagano | |
| 5,358,451 A | 10/1994 | Lacombe et al. | |
| 6,135,904 A | 10/2000 | Guthrie | |
| 6,443,032 B1 * | 9/2002 | Fujii et al. | 74/567 |
| 6,607,457 B2 * | 8/2003 | Kawakami | 474/80 |
| 7,563,186 B2 * | 7/2009 | Mercat et al. | 474/78 |
| 8,142,312 B2 | 3/2012 | Watarai | |
| 2003/0166427 A1 * | 9/2003 | Dillon et al. | 474/80 |
| 2007/0219029 A1 | 9/2007 | Turner | |
| 2009/0054183 A1 | 2/2009 | Takachi et al. | |
| 2012/0083371 A1 * | 4/2012 | Yamaguchi et al. | 474/80 |

FOREIGN PATENT DOCUMENTS

EP    2128014 A1    12/2009

* cited by examiner

*Primary Examiner* — Sang Kim
*Assistant Examiner* — Michael Riegelman
(74) *Attorney, Agent, or Firm* — James A. Deland (57) ABSTRACT

A bicycle derailleur comprises a base member adapted to be mounted to a bicycle, a movable member, a linkage mechanism coupled between the base member and the movable member so that the movable member moves relative to the base member, and a chain guide coupled to the movable member for movement relative to the movable member. A position-fixing member selectively fixes a position of the movable member relative to the chain guide.

18 Claims, 6 Drawing Sheets

BICYCLE DERAILLEUR WITH CHAIN GUIDE LOCKING

BACKGROUND OF THE INVENTION

The present invention is directed to bicycle transmission devices and, more particularly, to a bicycle derailleur with chain guide locking.

A typical bicycle derailleur transmission includes a plurality of sprockets that rotate together with a front crank or with a rear wheel, a chain, and a derailleur that selectively shifts the chain among the plurality of sprockets. A typical derailleur includes a base member adapted to be mounted to the bicycle frame, a movable member movably coupled to the base member, and a chain guide coupled to the movable member. The chain guide engages the chain to selectively switch the chain among the plurality of sprockets when the movable member moves relative to the base member.

The chain guide of a rear derailleur ordinarily is rotatably mounted to the movable member and is spring-biased in a clockwise direction (when viewed from the right side of the bicycle) so that the chain guide can take up the slack in the chain when the chain engages the smaller-diameter sprockets. However, during rough riding, bumps and shocks may cause the chain guide to rotate counterclockwise, thereby creating undesirable slack in the chain. To prevent this from occurring, motion resisting structures have been added to some rear derailleurs. An example of a motion resisting structure is disclosed in U.S. Patent Application Publication Number 2009/0054183 A1. As shown therein, a bicycle derailleur comprises a base member adapted to be mounted to a bicycle, a movable member movably coupled to the base member, and a chain guide coupled to the movable member. The chain guide is coupled for rotation around a rotational axis, and a biasing element biases the chain guide in a selected rotational direction around the rotational axis. A resistance applying unit applies a resistance to rotational movement of the chain guide in a direction opposite the selected rotational direction, and an adjusting unit adjusts an amount of resistance applied by the resistance applying unit.

SUMMARY OF THE INVENTION

The present invention is directed to various features of a bicycle transmission. In one embodiment, a bicycle derailleur comprises a base member adapted to be mounted to a bicycle, a movable member, a linkage mechanism coupled between the base member and the movable member so that the movable member moves relative to the base member, and a chain guide coupled to the movable member for movement relative to the movable member. A position-fixing member selectively fixes a position of the movable member relative to the chain guide. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
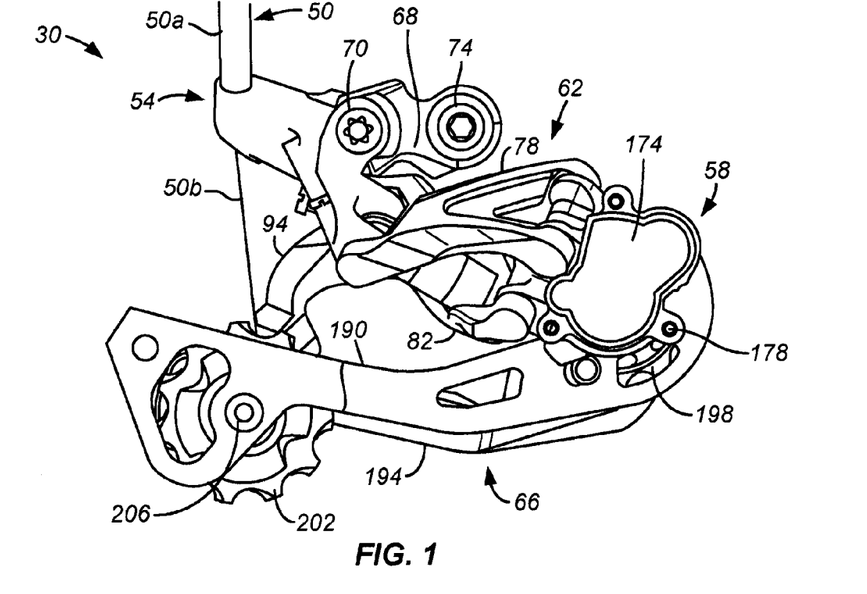
FIG. 1 is a side view of a particular embodiment of a rear derailleur.

FIG. 1 is a side view of a particular embodiment of a rear derailleur 30. Rear derailleur 30 comprises a base member 54, a movable member 58, a linkage assembly 62 and a chain guide 66. Base member 54 is structured to be rotatably mounted to a rear derailleur mounting member 68 through a mounting bolt 70, and linkage assembly 62 is coupled between base member 54 and movable member 58 so that chain guide 66 can move to a plurality of shift positions corresponding to the number of rear sprockets (not shown) on a bicycle in a well-known manner. Rear derailleur mounting member 68 is structured to be fixedly mounted to the rear of the bicycle frame through a mounting bolt 74. A return spring (not shown) biases movable member 58 either laterally inwardly or laterally outwardly, depending upon the application, relative to the plurality of rear sprockets. In this embodiment, the return spring biases movable member 58 laterally outwardly.

Figure 2:
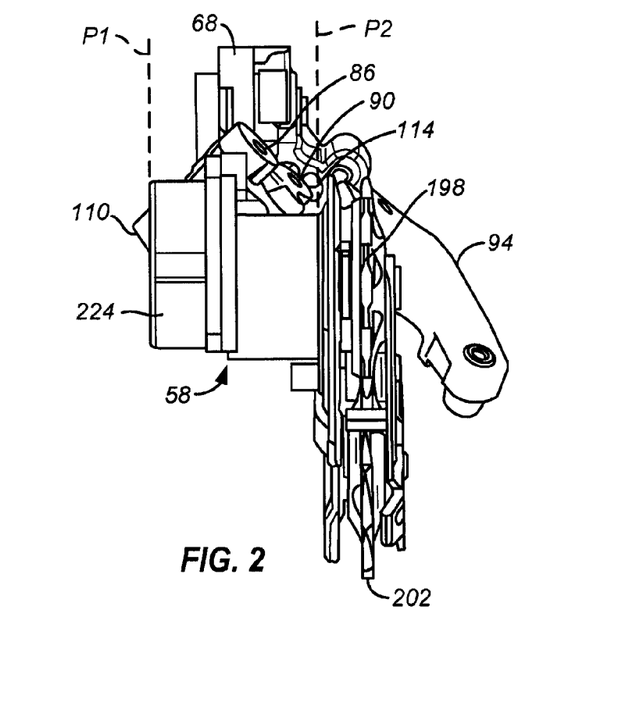
FIG. 2 is a front view of the derailleur.

Linkage assembly 62 includes a pair of parallel links 78 and 82. Link 78 is an upper/outer link, while link 82 is a lower/inner link. Links 78 and 82 are pivotally coupled to base member 54 through pivot pins (not shown), and links 78 and 82 are pivotally coupled to movable member 58 through pivot shafts 86 and 90 (FIG. 2). A derailleur actuating arm 94 extends rearward from a lower side of link 82. An outer casing 50a of Bowden cable 50 is terminated at base member 54 in a conventional manner, and an inner wire 50b of Bowden cable 50 is attached to actuating arm 94 in a conventional manner.

Figure 3:
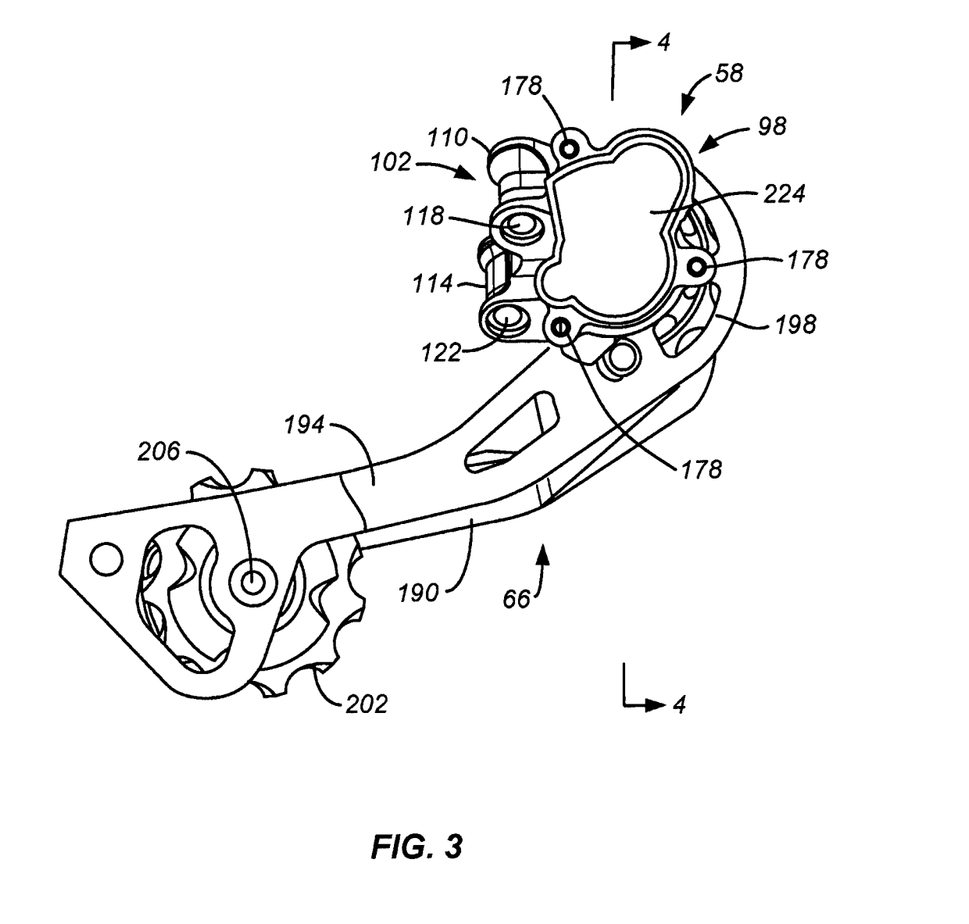
FIG. 3 is a side view of the movable member and chain guide detached from the rest of the derailleur.
Figure 4:
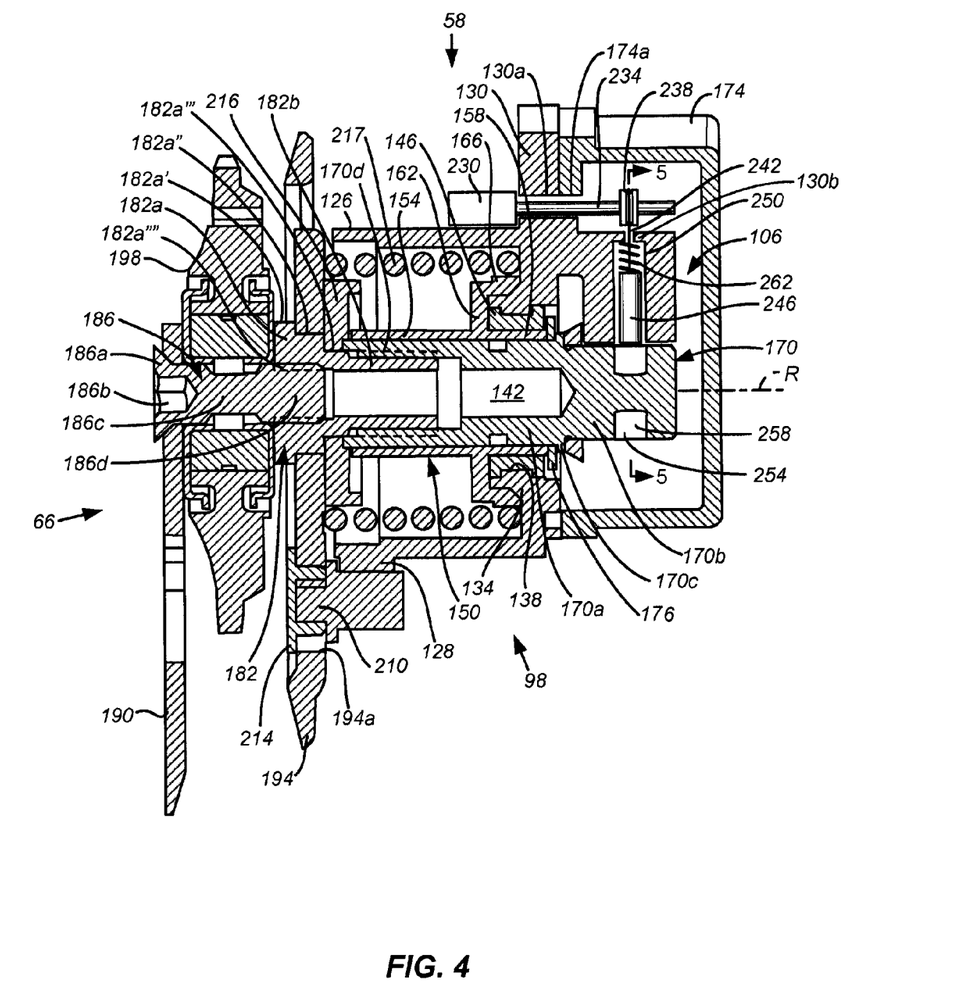
FIG. 4 is a cross-sectional view taken along line 4-4 in FIG. 3.

As shown in FIGS. 3 and 4, movable member 58 comprises a housing 98 and a link attachment portion 102. Housing 98 is fixedly attached to (e.g., integrally formed with) link attachment portion 102 and houses a portion of a locking mechanism 106 that is discussed in further detail below. Link attachment portion 102 comprises a pair of tubular link mounting ears 110 and 114 which have corresponding cylindrical openings 118 and 122 for receiving respective pivot shafts 86 and 90 therein.

As shown in FIG. 4, housing 98 comprises a generally tubular portion 126, a plate guiding ear 128 and a locking mechanism mounting flange 130. A radially inner portion of locking mechanism mounting flange 130 forms a mounting ledge 134 having an inner peripheral surface 138 that defines a mounting bore 142. A tubular bushing 146 is attached to the inner peripheral surface 138 of mounting ledge 134 so as to be disposed within mounting bore 142. A tubular shaft bearing 150 is attached to mounting ledge 134 and to tubular bushing 146. More specifically, shaft bearing 150 comprises a tubular first section 154, a tubular second section 158, a radially outwardly extending flange section 162, and a tubular mounting collar 166. Second section 158 is disposed radially within and contacts tubular bushing 146. Flange section 162 extends radially outwardly at a junction between first section 154 and second section 158, and mounting collar 166 extends axially to the right from the outer end of flange section 162. Mounting collar 166 surrounds and contacts mounting ledge 134.

A pivot shaft 170 is disposed within shaft bearing 150. Pivot shaft 170 includes a first portion 170a, a reduced-diameter second portion 170b and a radially outwardly extending retainer shoulder 170c disposed at a junction between first portion 170a and second portion 170b. First portion 170a is disposed within shaft bearing 150, and second portion 170b extends axially to the right from second section 158 of shaft bearing 150. A retainer washer 176 is fitted between retainer shoulder 170c and shaft bearing 150. In this embodiment, second portion 170b of pivot shaft 170 forms part of locking mechanism 106. Pivot shaft 170 also includes a threaded inner peripheral surface 170d on the left end thereof. A protective cover 174 is mounted to resistance element mounting flange 130 through screws 178 (FIG. 3) to protect the enclosed components from the outside environment.

Chain guide 66 is mounted to pivot shaft 170 through a chain guide interface shaft 182 and a chain guide mounting shaft 186 for rotation around a rotational axis R. As shown in FIGS. 3 and 4, chain guide 66 includes a first chain guide plate 190, a second chain guide plate 194, a guide pulley 198 rotatably supported between first chain guide plate 190 and second chain guide plate 194 by chain guide mounting shaft 186, and a tension pulley 202 rotatably supported between first chain guide plate 190 and second chain guide plate 194 by a pivot shaft 206 that is connected to first chain guide plate 190 and to second chain guide plate 194. As shown in FIG. 4, chain guide interface shaft 182 includes a head portion 182a and a threaded shaft portion 182b. Threaded shaft portion 182b screws into the threaded inner peripheral surface 170d of pivot shaft 170 so that pivot shaft 170 and chain guide interface shaft 182 rotate together as an integral unit. Head portion 182a has the form of a three-step head including a first step portion 182a', a second step portion 182a" and a third step portion 182a'". First step portion 182a' functions as a spacer between guide pulley 198 and second chain guide plate 194, and second step portion 182a" fixedly supports second chain guide plate 194. Second chain guide plate 194 includes an arcuate guide slot 194a that receives a threaded shaft 210 and a bearing nut 214 therein. Threaded shaft 210 extends axially from plate guiding ear 128 of tubular portion 126 of housing 98. Third step portion 182a'" supports a cap member 216 that helps to prevent contaminants from entering tubular portion 126 of housing 98. Finally, head portion 182 includes a threaded inner peripheral surface 182a"".

Chain guide mounting shaft 186 includes a head portion 186a with a hexagonal tool-engaging opening 186b, an intermediate pivot shaft portion 186c and a threaded end portion 186c. Head portion 186a fixedly supports first chain guide plate 190, and intermediate pivot shaft portion 186c rotatably supports guide pulley 198. Threaded end portion 186c screws into the threaded inner peripheral surface 182a"" of chain guide interface shaft 182 so that pivot shaft 170, chain guide interface shaft 182, chain guide mounting shaft 186, first chain guide plate 190 and second chain guide plate 194 rotate together as an integral unit. A coil spring 217 has a first end mounted to locking mechanism mounting flange 130 and a second end mounted to second chain guide plate 194 to bias chain guide 66 in the clockwise direction and thereby take up slack in the bicycle chain.

Figure 5:
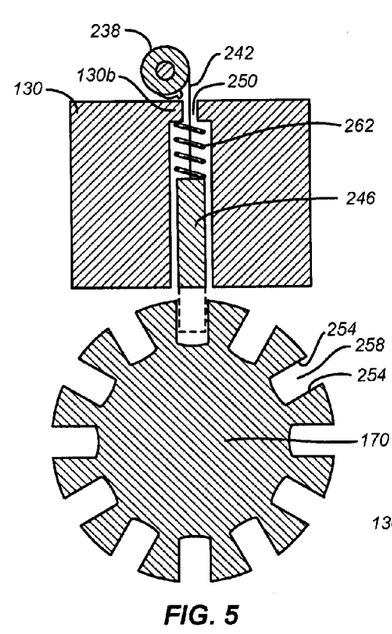
FIG. 5 is a cross-sectional view taken along line 5-5 in FIG. 4.

As shown in FIGS. 4 and 5, locking mechanism 106 includes an actuator in the form of an externally-mounted motor 230 having an output shaft 234 that extends through an opening 130a in locking mechanism mounting flange 130 and through an opening 174a in cover 174, a cable reel 238 attached to output shaft 234 for winding a cable 242, a position-fixing member such as a first abutment element in the form of a locking shaft 246 slideably disposed in a bore 250 formed in locking mechanism mounting flange 130, and a plurality of second abutment elements in the form of a plurality of circumferential walls 254 that form a plurality of recesses or openings 258 in second portion 170b of pivot shaft 170. Each opening 258 is dimensioned for receiving locking shaft 246 therein. Locking shaft 246 is biased radially inwardly towards pivot shaft 170 by a biasing member in the form of a spring 262 disposed between locking shaft 246 and a spring abutment portion 130b of locking mechanism mounting flange 130.

When motor 230 rotates cable reel 238 in a cable unwinding direction and one of the plurality of openings 258 in pivot shaft 170 aligns with bore 250 in locking mechanism mounting flange 130, then spring 262 moves locking shaft 246 from a disengaged position (shown by solid lines in FIG. 5), wherein locking shaft 246 is disengaged from circumferential walls 254 in pivot shaft 170, to an engaged position (shown by broken lines in FIG. 5), wherein locking shaft 246 is disposed in one of the plurality of openings 258 and engages circumferential walls 254 in pivot shaft 170. Since locking shaft 246 is a projecting member coupled to movable member 58 through locking mechanism mounting flange 130, and since pivot shaft 170 is coupled to chain guide 66 through chain guide interface shaft 182 and chain guide mounting shaft 186, locking shaft 246 functions as a position-fixing member that selectively fixes chain guide 66 in a plurality of potential angular positions relative to movable member 58.

Figure 6:
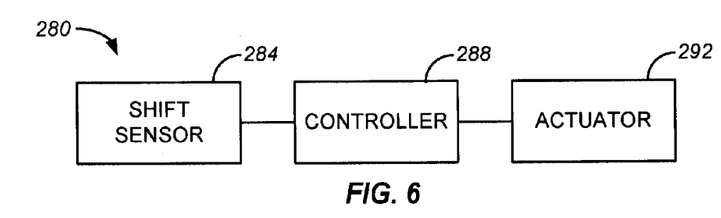
FIG. 6 is a block diagram of an embodiment of a control mechanism for the chain guide locking mechanism.

FIG. 6 is a block diagram of an embodiment of a control mechanism 280 for chain guide locking mechanism 106. Control mechanism 280 includes a shift sensor 284, a controller 288 and an actuator 292, wherein shift sensor 284 is operatively coupled to controller 288, and controller 288 is operatively coupled to actuator 292. Shift sensor 284 may be a shift operating lever or switch mounted to the bicycle handlebar, a position sensor for rear derailleur 30, a shift cable position sensor for rear derailleur 30, or any other sensor that provides a signal when it is desired to unlock the position of chain guide 66 relative to movable member 58. Controller 288 may be a cycle computer mounted to the bicycle handlebar, wherein controller 288 is programmed to operate actuator 292 to usually lock the position of chain guide 66 relative to movable member 58 when rear derailleur 30 is in an operating condition (i.e., when the bicycle is in an assembled state for riding, and particularly when guide pulley 198 and tension pulley 202 are rotating to feed the chain to the appropriate sprocket). Alternatively, controller 288 may be disposed on rear derailleur 30. In this embodiment, actuator 292 comprises motor 230, and controller 288 is programmed to provide signals to motor 230 in response to signals from shift sensor 284 to selectively rotate cable reel 238 in the cable winding and cable unwinding directions to lock the position of chain guide 66 relative to movable member 58. Since motor 230 is mounted outside of movable member 58, motor 230 is an example of an operating member that is operable from outside of movable member 58 via the electrical signals provided by controller 288. Preferably, chain guide 66 is unlocked before movable member 58 begins moving to initiate the shifting operation.

Figure 7:
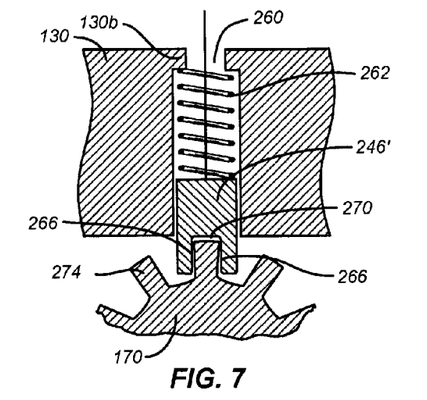
FIG. 7 is a cross-sectional view similar to FIG. 5 showing a more detailed view of an alternative embodiment of a locking mechanism.

FIG. 7 is a cross-sectional view similar to FIG. 5 showing a more detailed view of a locking mechanism 106' that operates in the same manner as locking mechanism 106 in the first embodiment except as follows. In this embodiment, the bottom portion of a locking shaft 246' includes abutment elements in the form of a pair of side walls 266 that form an opening 270 for receiving selected ones of a plurality of abutment elements in the form a plurality of projections 274 formed on the outer peripheral surface of pivot shaft 170. This embodiment operates the same as the first embodiment.

Figure 8:
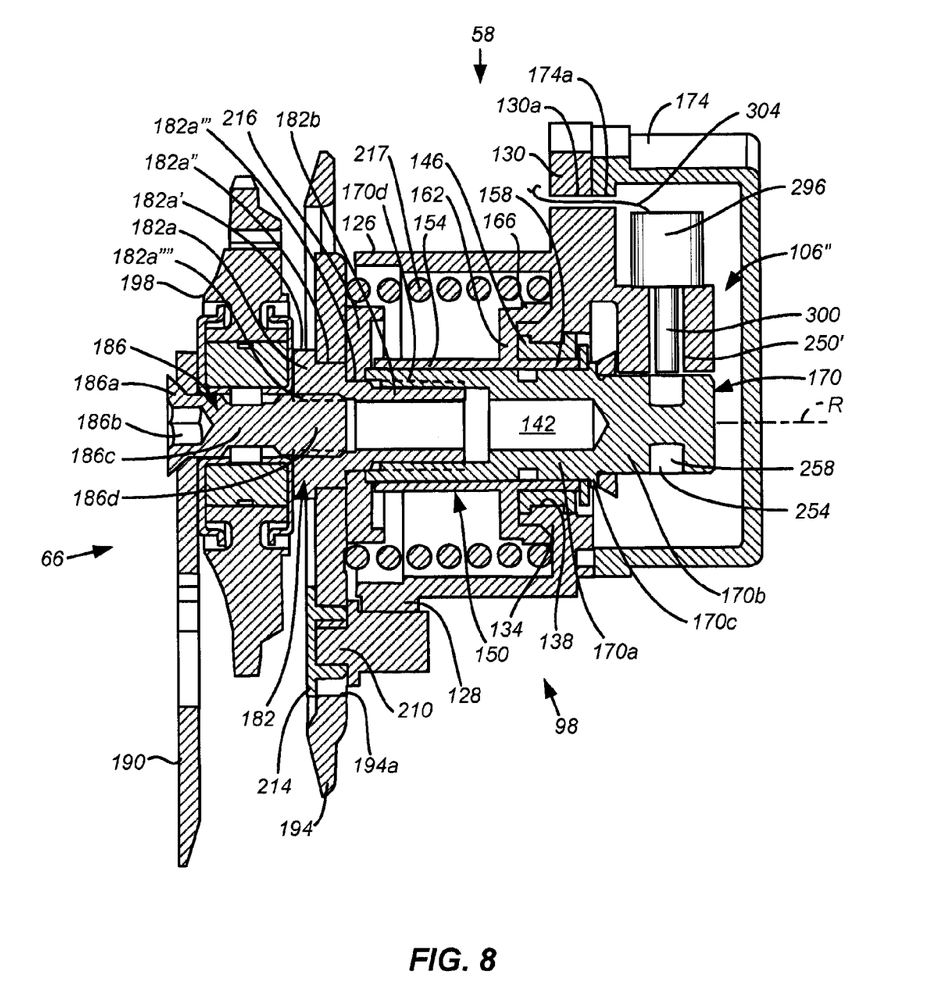
FIG. 8 is a cross-sectional view similar to FIG. 4 showing an alternative embodiment of a locking mechanism.

FIG. 8 is a cross-sectional view similar to FIG. 5 showing an alternative embodiment of a locking mechanism 106" that operates basically the same as locking mechanism 106 in the first embodiment except motor 230, output shaft 234, cable reel 238, cable 242 and locking shaft 246 have been replaced by a solenoid 296 mounted to locking mechanism mounting flange 130. Solenoid 296 reciprocally operates a locking shaft 300 in response to signals received from controller 288 through wires 304. As in the first embodiment, locking shaft 300 engages selected ones of the plurality of openings 258 formed in pivot shaft 170 to selectively fix movable member 58 in a plurality of angular positions relative to chain guide 66. In this embodiment, solenoid 296 and locking shaft 300 are disposed inside of movable member 58.

Figure 9:
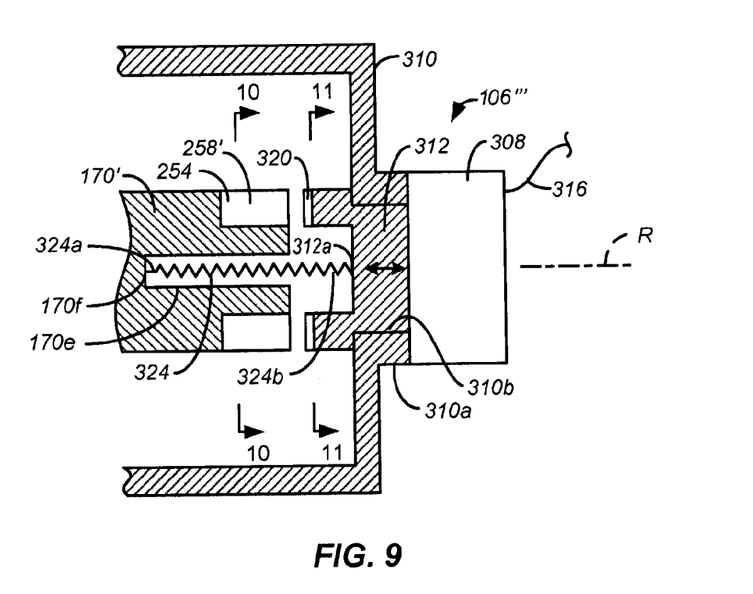
FIG. 9 is a cross-sectional view similar to FIG. 4 showing another alternative embodiment of a locking mechanism.
Figure 10:
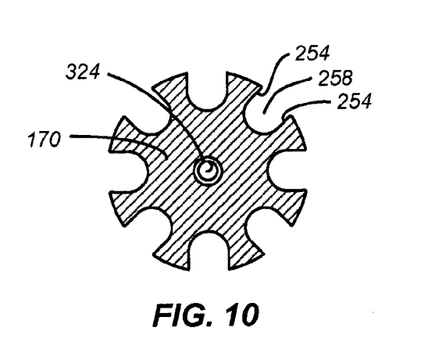
FIG. 10 is a cross-sectional view taken along line 10-10 in FIG. 9.
Figure 11:
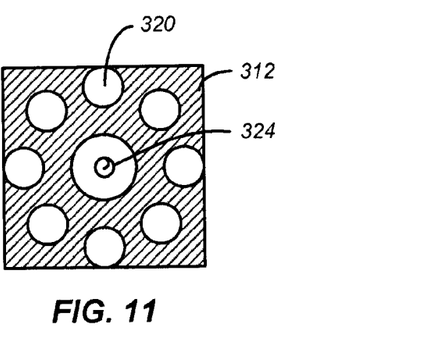
FIG. 11 is a cross-sectional view taken along line 11-11 in FIG. 9.

FIG. 9 is a cross-sectional view similar to FIG. 5 showing another alternative embodiment of a locking mechanism 106'''. In this embodiment, circumferential walls 254 in a pivot shaft 170' extend axially through the end of pivot shaft 170' so that openings 258 likewise extend through the end of pivot shaft 170' as shown in FIGS. 9 and 10. A solenoid 308 is mounted to an annular mounting boss 310a of a protective cover 310 that is a modified version of protective cover 174 from the first embodiment. Solenoid 308 reciprocally operates a locking shaft 312 in response to signals received from controller 288 through wires 316. In this embodiment, locking shaft 312 extends through an opening 310b in mounting boss 310a. As shown in FIG. 11, locking shaft 312 includes a plurality of axially projecting members 320 arranged in a circle. A biasing member in the form of a spring 324 is disposed in a bore 170e of pivot shaft 170' and has a first spring end 324a attached to a spring mounting location 170f in pivot shaft 170'. Spring 324 extends axially out from bore 170e and has a second spring end 324b attached to a spring mounting location 312a at locking shaft 312. As a result, locking shaft 312 is biased axially towards pivot shaft 170'. Projecting members 320 engage the plurality of openings 258 formed in pivot shaft 170' to selectively fix chain guide 66 in a plurality of potential angular positions relative to movable member 58.

Figure 12:
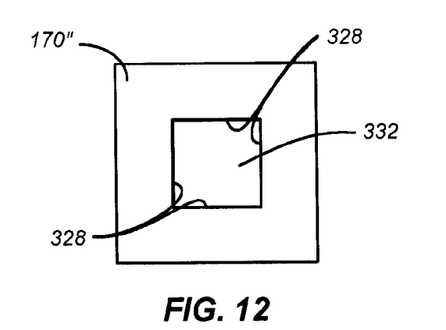
FIG. 12 is a cross-sectional view similar to FIG. 10 showing an alternative embodiment of a pivot shaft.
Figure 13:
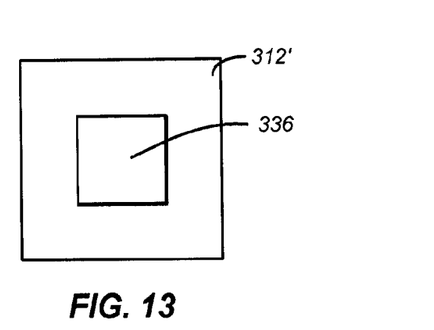
FIG. 13 is a cross-sectional view similar to FIG. 11 showing an alternative embodiment of a solenoid shaft.

In a modification of the above embodiment shown in FIGS. 12 and 13, a pivot shaft 170" could include a plurality of abutment walls 328 that form a central opening 332. In this embodiment, four abutment walls 328 form a square central opening 332. To accommodate this configuration, a locking shaft 312' has a complementary square projecting member 336. Projecting member 336 engages central opening 332 formed in pivot shaft 170" to selectively fix chain guide 66 in a plurality of potential angular positions relative to movable member 58.

While the above is a description of various embodiments of inventive features, further modifications may be employed without departing from the spirit and scope of the present invention. The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A bicycle derailleur comprising:
   a base member adapted to be mounted to a bicycle;
   a movable member;
   a linkage mechanism coupled between the base member and the movable member so that the movable member moves relative to the base member;
   a chain guide coupled to the movable member for bidirectional movement relative to the movable member; and
   a position-fixing member that selectively inhibits both directions of movement of the bidirectional movement of the chain guide relative to the movable member when the derailleur is in an operating condition.

2. The derailleur according to claim 1 wherein the position-fixing member comprises a first abutment element coupled to the movable member for engaging a second abutment element coupled to the chain guide.

3. The derailleur according to claim 2 further comprising a plurality of at least either the first abutment elements or the second abutment elements so that the chain guide can be fixed in a plurality of positions relative to the movable member.

4. The derailleur according to claim 2 wherein at least either the first abutment element or the second abutment element comprises a projecting member.

5. The derailleur according to claim 4 wherein the other of the first abutment element or the second abutment element forms an opening for receiving the projecting member therein.

6. The derailleur according to claim 2 wherein the first abutment element comprises a projecting member.

7. The derailleur according to claim 6 wherein the projecting member is movably coupled to the movable member.

8. The derailleur according to claim 7 wherein the projecting member moves relative to the movable member between an engaged position for engaging the second abutment element and a disengaged position for disengaging from the second abutment element.

9. The derailleur according to claim 8 further comprising a biasing member that biases the projecting member towards the engaged position.

10. The derailleur according to claim 8 further comprising an operating member that moves the projecting member, wherein the operating member is operable from outside of the movable member.

11. The derailleur according to claim 8 further comprising a plurality of the second abutment elements so that the chain guide can be fixed in a plurality of positions relative to the movable member.

12. The derailleur according to claim 8 wherein the projecting member comprises a locking shaft.

13. The derailleur according to claim 12 wherein the locking shaft is disposed in an opening in a wall of the movable member.

14. The derailleur according to claim 13 further comprising an operating member that moves the projecting member, wherein the operating member is operable from outside of the movable member.

15. The derailleur according to claim 14 further comprising a plurality of the second abutment elements so that the chain guide can be fixed in a plurality of positions relative to the movable member.

16. The derailleur according to claim 15 wherein a pivot shaft is coupled to the chain guide so that the chain guide pivots relative to the movable member, and wherein the plurality of second abutment elements are disposed on the pivot shaft.

17. The derailleur according to claim 16 wherein a plurality of recesses disposed on the pivot shaft are formed by the plurality of second abutment elements.

18. The derailleur according to claim 17 further comprising a biasing member that biases the projecting member towards the engaged position.

* * * * *